(12) United States Patent
Menheere et al.

(10) Patent No.: US 11,384,687 B2
(45) Date of Patent: Jul. 12, 2022

(54) ANTI-ICING SYSTEM FOR GAS TURBINE ENGINE

(71) Applicant: PRATT & WHITNEY CANADA CORP., Longueuil (CA)

(72) Inventors: David Menheere, Norval (CA); Richard Kostka, Mississauga (CA); Steven Strecker, Erin (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 389 days.

(21) Appl. No.: 16/451,548

(22) Filed: Jun. 25, 2019

(65) Prior Publication Data

US 2020/0318541 A1    Oct. 8, 2020

Related U.S. Application Data

(60) Provisional application No. 62/829,274, filed on Apr. 4, 2019.

(51) Int. Cl.
*F02C 7/047* (2006.01)
*F01D 25/02* (2006.01)
(Continued)

(52) U.S. Cl.
CPC .............. *F02C 7/047* (2013.01); *F01D 25/02* (2013.01); *B64D 2033/0233* (2013.01); *F02C 6/08* (2013.01); *F05D 2260/207* (2013.01)

(58) Field of Classification Search
CPC .... F02C 7/047; F02C 6/08; F02C 9/18; F05D 2260/207; Y02T 50/60; F01D 25/02;
(Continued)

(56) References Cited

U.S. PATENT DOCUMENTS 5,423,174 A * 6/1995 Mouton .................. F02C 7/224
60/39.093
7,823,374 B2 * 11/2010 Venkataramani ....... F02C 7/047
60/39.093
(Continued)

*Primary Examiner* — Gerald L Sung
*Assistant Examiner* — Rene D Ford
(74) *Attorney, Agent, or Firm* — Norton Rose Fulbright Canada LLP

(57) ABSTRACT

An anti-icing system for a gas turbine engine comprises a closed circuit containing a phase-change fluid, at least one heating component for boiling the phase-change fluid, the anti-icing system configured so that the phase-change fluid partially vaporizes to a vapour state when boiled by the at least one heating component. The closed circuit has an anti-icing cavity adapted to be in heat exchange with an anti-icing surface of the gas turbine engine for the phase-change fluid to release heat to the anti-icing surface and condense. A feed conduit(s) has an outlet end in fluid communication with the anti-icing cavity to feed the phase-change fluid in vapour state from heating by the at least one heating component to the anti-icing cavity, and at least one return conduit having an outlet end in fluid communication with the anti-icing cavity to direct condensed phase-change fluid from the anti-icing cavity to the at least one heating component. A method for heating an anti-icing surface of an aircraft is also provided.

15 Claims, 2 Drawing Sheets

(51) Int. Cl.
*B64D 33/02* (2006.01)
*F02C 6/08* (2006.01)

(58) Field of Classification Search
CPC .................. B64D 2033/0233; B64D 15/02; B64D 15/06; B64D 15/166
See application file for complete search history.

(56) References Cited

U.S. PATENT DOCUMENTS

| | | | |
|---|---|---|---|
| 7,984,606 B2 * | 7/2011 | Smith | F02C 7/14 60/266 |
| 8,015,788 B2 * | 9/2011 | Stephenson | F01D 5/046 60/39.093 |
| 8,899,008 B2 * | 12/2014 | Jones | F02C 7/08 60/39.093 |
| 9,422,063 B2 | 8/2016 | Diaz | |
| 9,945,247 B2 * | 4/2018 | Appukuttan | F01D 25/02 |
| 10,017,260 B2 | 7/2018 | Moscatelli et al. | |
| 10,173,780 B2 * | 1/2019 | Mackin | B64D 15/06 |
| 10,233,841 B2 * | 3/2019 | Bintz | F02C 7/14 |
| 10,294,822 B2 * | 5/2019 | Caruel | F01D 25/24 |
| 2006/0032983 A1 * | 2/2006 | Brand | B64D 15/04 244/134 R |
| 2008/0053100 A1 * | 3/2008 | Venkataramani | F02C 7/14 60/772 |
| 2008/0159852 A1 * | 7/2008 | Stephenson | F02C 7/047 415/178 |
| 2009/0120099 A1 * | 5/2009 | Brand | F01D 25/02 60/785 |
| 2014/0369812 A1 * | 12/2014 | Caruel | B64D 33/02 415/116 |
| 2015/0377130 A1 * | 12/2015 | Xu | F02C 7/047 60/779 |
| 2016/0017751 A1 * | 1/2016 | Caruel | F01D 25/12 415/175 |
| 2016/0311542 A1 * | 10/2016 | Mackin | B64D 15/12 |
| 2018/0127108 A1 * | 5/2018 | Lebeda | F02C 7/04 |
| 2018/0216529 A1 | 8/2018 | Maalioune et al. | |
| 2018/0229850 A1 * | 8/2018 | Menheere | F02C 7/047 |

* cited by examiner

ANTI-ICING SYSTEM FOR GAS TURBINE ENGINE

CROSS-REFERENCE TO RELATED APPLICATIONS

The present application claims priority of U.S. Provisional Application No. 62/829,274 filed on Apr. 4, 2019, the subject matter of which is incorporated herein by reference in its entirety.

TECHNICAL FIELD

The application relates generally to gas turbine engines and, more particularly, to an anti-icing system of a gas turbine engine.

BACKGROUND OF THE ART

Icing on flow surfaces of gas turbine engines, such as engine intake splitter, can cause problems with engine operation due to inlet distortion due to blockage and foreign object damage (FOD) due to ingestion into the core. In aircraft, traditional de-icing and/or anti-icing methods and systems require high temperature bleed air from the engine to be ducted to the inlet or areas requiring anti-icing. The bleed air in high pressure ratio engines is at a high temperature and materials have to carefully chosen to sustain such high temperatures. In the event that materials with relatively low melting points are used for the flow surfaces of the gas turbine engines, additional equipment may be required to control bleed air feed used to de-ice such surfaces.

SUMMARY

In one aspect, there is provided an anti-icing system for a gas turbine engine comprising: a phase-change fluid housed in an anti-icing cavity, the phase-change fluid and cavity configured to be in heat exchange relationship with a surface of the gas turbine engine to be anti-iced, and a heating circuit having at least one heat exchanger in the anti-icing cavity for boiling the phase-change fluid, the heating circuit in fluid communication with a compressor discharge of the gas turbine engine to direct compressor bleed air to the heat exchanger.

In another aspect, there is provided a method for anti-icing a surface of a gas turbine engine comprising: directing bleed air of the gas turbine engine to a heat exchanger in communication with a phase-change fluid in a closed anti-icing cavity to boil the phase-change fluid into a vapour state, and condensing the phase-change fluid in the vapour state by heating the anti-icing surface conductively with the phase-change fluid.

In another aspect, there is provided a gas turbine engine comprising: an anti-icing surface, a closed anti-icing cavity adapted to be in heat exchange with of the gas turbine engine, a phase-change fluid in the anti-icing cavity, and a heating circuit having at least one heat exchanger in a liquid pool of the phase-change fluid in the anti-icing cavity for boiling the phase-change fluid, a vapor of the phase-change fluid releasing heat to the anti-icing surface to condense, the heating circuit in fluid communication with a compressor discharge of the gas turbine engine to direct compressor bleed air to the heat exchanger.

DESCRIPTION OF THE DRAWINGS

Reference is now made to the accompanying figures in which.

DETAILED DESCRIPTION

Figure 1:
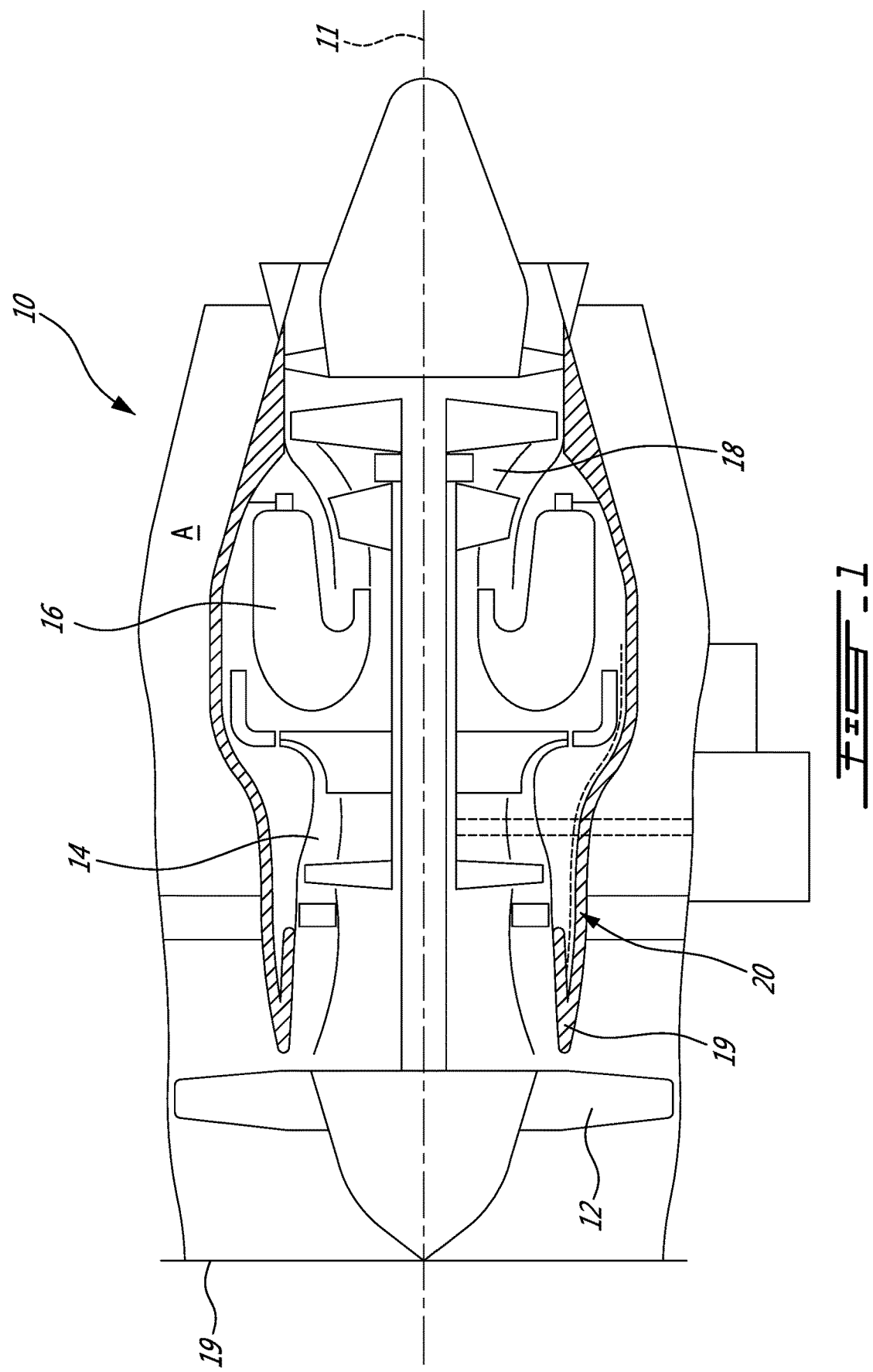
FIG. 1 is a schematic cross-sectional view of a gas turbine engine.

FIG. 1 illustrates a gas turbine engine 10, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 may also have leading surfaces such as shown by 19, upon which frost or ice may have a tendency to form. Such leading surfaces 19 may also be referred to as anti-icing surface, defrost surface, exposed surface in that it is exposed to ambient air, and an exterior surface. In FIG. 1, the leading surface 19 is that of the splitter separating the engine core from a bypass duct A. As other examples, the leading surface 19 may be that of an inlet of the engine case, of the nacelle, of the bypass duct, etc. The gas turbine engine 10 may be a turbofan.

Figure 2:
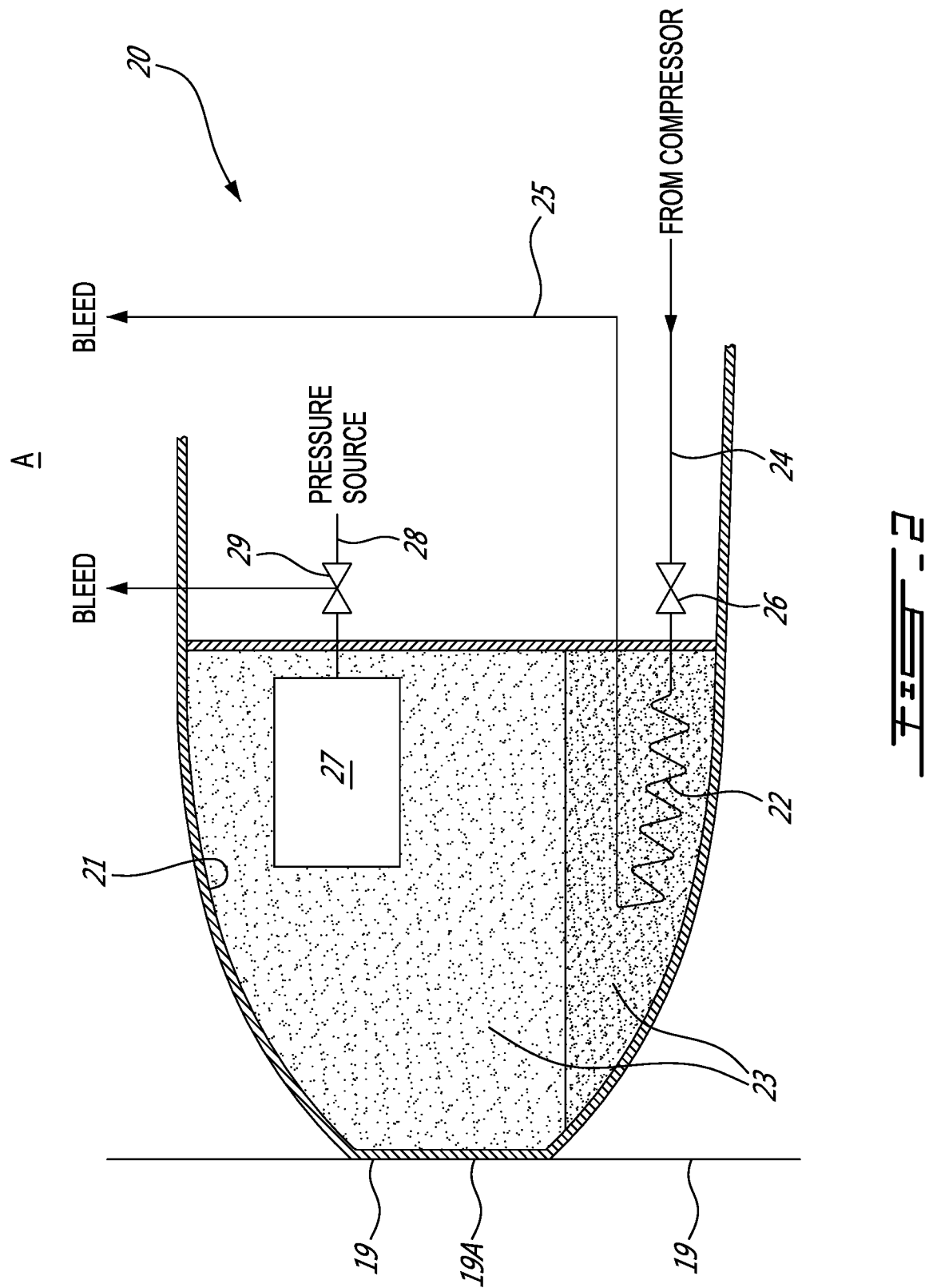
FIG. 2 is a block diagram of an anti-icing system for a gas turbine engine in accordance with the present disclosure.

Referring to FIG. 2, an anti-icing system in accordance with the present disclosure is generally shown at 20. The expression "anti-icing" in anti-icing system may refer to the capacity of the system 20 to melt frost or ice formations (a.k.a., ice build-ups), and/or the capacity of the system 20 to prevent frost or ice formation, or cause a defrost.

The anti-icing system 20 may have an anti-icing cavity 21. The anti-icing cavity 21 may be at any location in the gas turbine engine 10 in which anti-icing and/or de-icing is required. As described hereinafter, according to one embodiment, the anti-icing cavity 21 is conductively related to any of the leading surfaces 19 requiring anti-icing or de-icing. Moreover, the leading surface 19 may also be part of other aircraft components, including the wings. According to an embodiment, the wall defining a portion of the anti-icing cavity 21 includes the leading surface 19. Hence, such direct conductive relation, in contrast to embodiments of the present disclosure in which a gap is between the anti-icing cavity 21 and the leading surface 19 (e.g., liquid gap, hydrogen gap, helium gap, conductive gel gap, conductive adhesive gap, conductive composite material gap, metallic insert composite gap), may more efficiently provide anti-icing to the leading surface 19. According to an embodiment, the leading surface 19 is part of the outer skin of the engine inlet, and the anti-icing cavity 21 is delimited aft by the outer skin. For example, the outer skin making up the leading surface 19 is aluminum.

In FIGS. 1 and 2, it is observed that the anti-icing cavity 21 may be a single annular cavity, surrounding axis 11. In an embodiment, the anti-icing cavity 21 may be separated into a plurality of compartments, for instance by plates that may be radially oriented relative to the axis 11.

The anti-icing cavity 21 is a closed chamber (e.g., a sealed chamber), in that the fluid(s) it contains is(are) captive therein, with the exception of undesired leaks. Hence, the anti-icing cavity 21 is closed in that it allows heat exchanges as desired, but generally prevents a transfer of mass or loss of mass of the fluid(s) it contains. The anti-icing cavity 21 includes a cooling fluid 23, selected to be a phase-change fluid, i.e., selected for the fluid to change phase during operation of the anti-icing system 20. The cooling fluid 23 may also be known as a coolant, as a refrigerant, etc. The cooling fluid 23 is said to be a phase-change fluid in that it changes phases between liquid and vapour in a vapour-condensation cycle, in such a way that it may store latent heat and efficiently absorb heat while remaining at a same temperature during phase change. Moreover, the phase-change fluid 23 is known to have a greater density when in a liquid phase than in a vapour phase, which results in condensate to drip by gravity while vapour rises. According to an embodiment, the phase-change fluid is alcohol or alcohol-based, and may include other constituents, such as water, salts, etc. Alternatively, other phase-change fluids, such as without water, may be used. In an embodiment, the phase-change fluid is non flammable. Hence, the phase-change fluid 23 is in a vapour state and in a liquid state in the anti-icing cavity 21.

According to an embodiment, one or more heat exchangers 22 is located in the anti-icing cavity 21, for coolants circulating in the heat exchangers 22 to be in a heat exchange relation with the fluid 23 in the anti-icing cavity 21, i.e., in a non-mass transfer relation. The heat exchangers 22 may be positioned in a liquid pool of phase-change fluid 23 of the anti-icing cavity 21, whereby the heat exchangers 22 are immersed into liquid. In an embodiment, the position is selected as a function of the range of operating conditions of the gas turbine engine 10 to ensure that the heat exchanger 22 is always immersed in the liquid pool. Although shown schematically in FIG. 2, the heat exchangers 22 may have any appropriate configuration or surface component to enhance heat exchange, such as coils, fins, etc. Moreover, although the heat exchanger 22 is depicted as sharing a same compartment of the anti-icing cavity 21, all or some of the heat exchangers 22 may have their own dedicated compartment of the anti-icing cavity 21, in an embodiment featuring numerous heat exchangers 22. It is also contemplated to provide as part of the exchangers 22 an electric heating coil that is powered to boil the phase-change fluid 23. The heating coil may be the sole source of heating power for the phase-change fluid 23, or may be a back-up or auxiliary source of power, to supplement bleed air.

According to an embodiment, the heat exchanger 22 is connected to a feed conduit 24. The feed conduit 24 may also be referred to as a pipe, a duct, a line, etc. The feed conduit 24 may extend from a compressor chamber of the compressor section 14, whereby bleed air may be directed from the compressor section 14 to the heat exchanger 22. Stated differently, the feed conduit 24 may be in fluid communication with a compressor chamber, for bleed air to be diverted to the heat exchanger(s) 22. Bleed air is in a compressed and hot state, to be sufficient hot to drive the anti-icing operation. The feed conduit 24 may be connected to any appropriate stage of compression (e.g., P3 air), and in some instances may be downstream of the compressor section 14.

A discharge conduit 25 may be connected to a downstream end of the heat exchanger 22. The discharge conduit 25 may also be referred to as a pipe, a duct, a line, etc. The discharge conduit 25 may discharge the bleed air after its passage through the heat exchanger 22. In an embodiment, the discharge conduit 25 is in fluid communication with the bypass duct A, to discharge the bleed air thereat. FIG. 2 shows a schematic configuration of the anti-icing system 20 with a single feed conduit 24 and single return conduit 25, but 24 and 25 may include networks of conduits in any appropriate arrangements, for instance as shown in embodiments described hereinafter. Concurrently, the heat exchangers 22 and conduits 24 and 25 may be part of a heating circuit.

A flow regulator(s) 26 may optionally be provided in one of the feed conduits 24 and/or the discharge conduit 25, such as to regulate a flow of the bleed air to the heat exchangers 22 and/or act as an on-off valve. An operation of the flow regulator 26 may consequently control a boiling temperature of the phase-change fluid 23. The flow regulator 26 may be any appropriate device to control the flow, such as valves of any appropriate type. According to an embodiment, the flow regulator 26 is a sourceless device, in that it is not powered by an external power source, and that is set based on the planned operation parameters of the gas turbine engine 10. For example, the flow regulator 26 may be spring operated. Alternatively, the flow regulator 26 may be a powered device, such as a solenoid valve, for instance with associated sensors or pressure detectors.

Referring to FIG. 2, a pressure-regulating bladder(s) 27 may be provided in the anti-icing cavity 21. In an embodiment in which the anti-icing cavity 21 is segmented in two or more compartments, there may or may not be a pressure-regulating bladder 27 per compartment. The pressure-regulating bladder 27 is an inflatable bladder, whose volume may be varied. The pressure-regulating bladder 27 may be connected to a pressure source and a discharge, for example via conduits 28 and valves 29. In an embodiment, the pressure source may also be the compressor section 14, with bleed air feeding the pressure-regulating bladder(s) 27. In yet another embodiment, the pressure-regulating bladder 27 is also connected to the bleed air network feeding the heat exchanger(s) 22, i.e., the conduits 24 and 25. Appropriate valves, such as 29, may be present in such a scenario.

As the pressure-regulating bladder 27 is in the anti-icing cavity 21, and as the anti-icing cavity 21 is a closed chamber of fixed volume, a variation of the size of the pressure-regulating bladder 27 will impact a pressure of the phase-change fluid 23 in the anti-icing cavity 21. This consequently causes a variation of the boiling temperature of the phase-change fluid 23. Therefore, a temperature within the anti-icing cavity 21 can be adjusted by modifying the chamber pressure via the pressure-regulating bladder 27 and consequently the vapour point of the phase-change fluid 23.

The phase-change fluid 23 is consequently vaporized by the heat exchanger 22, such as by bleed air in one of the embodiments. The vapor phase-change fluid 23 will fill the anti-icing cavity 21 above the liquid line. Some of the vapor phase-change fluid 23 will condense on the wall of the anti-icing cavity 21 in heat exchange with the leading surface 19. In heating the leading surface 19, the phase-change fluid 23 may condense. The leading surface 19 may therefore be heated to the condensation temperature of the phase-change fluid 23, without substantially exceeding the condensation temperature. Moreover, by the inflating/deflating of the pressure-regulating bladder 27, an additional level of temperature control may be achieved.

The ambient presence of vapor phase-change fluid 23 may ensure a constant presence of heat against the leading surface 19. According to an embodiment, the anti-icing system 20 relies on vapour density to feed the anti-icing cavity 21 and on gravity for the condensate to reach the bottom of the anti-icing cavity 21, such that no motive force is required to move the phase-change fluid 23 to the heat exchangers 22, i.e., no powered device may be necessary. Accordingly, in an embodiment, the heat exchanger(s) 22 is at a bottom of the anti-icing cavity 21 or of a respective compartment of the anti-icing cavity 21. Likewise, as one of the contemplated embodiments uses bleed air to feed the heat exchanger(s) 22, no additional motive force may be required to circulate the coolant in the heat exchanger(s) 22. The bleed air may be produced by the compressor section 14, but with a primary purpose of participating to the combustion of the gas turbine engine 10, whereby the compressor section 14 does not constitute an "additional" motive force. However, it is contemplated to provide a pump (such as one or more electric pumps) or like powered device to assist in moving the coolant.

The heat exchanger(s) 22 may not be in direct contact with the material of the wall 19A of the leading surface 19. In an embodiment, the wall 19A of the leading surface 19 is shared with the anti-icing cavity 21 (one way of conductively connecting them), and the heat exchanger(s) 22 is spaced from said wall, and isolated from the wall by the phase-change fluid 23. Therefore, the phase-change fluid 23 may serve as a buffer insulating the wall 19A of the leading surface 19 from the heat of the bleed air. Therefore, materials with lower melting points, such as aluminum, may be used for the wall 19A. However, other materials such as steel may also be used for the wall 19A.

The anti-icing system 20 is of relatively low pressure and low temperature along with the possibility of employing a non flammable phase-change fluid 23. The anti-icing cavity 21 of the anti-icing system 20 may be sized as needed for cooling. The resulting anti-icing system 20 and related method of anti-icing the inlet surface 19 relies on vapour generation to supply a high-energy vapour feed inside the anti-icing cavity 21 where the vapour condenses and transfers energy to the leading surface 19. The vapour is at a relatively low but consistent temperature in comparison to engine bleed air, due to its boiling point, which may optionally be adjusted by way of the pressure-regulating bladder 27. Because of the simplicity of the anti-icing system 20, inspection or service port requirements may be reduced, such that the drag and esthetics of the nacelle are not substantially affected by the anti-icing system 20. The anti-icing system 20 could remain on at all times, to eliminate the valve 26. The anti-icing system 20 could generate heat shortly after start of the engine 10, due to the inherent heat generation of a gas turbine engine 10, and the necessity to cool it.

No special control system may be required since the temperature of the leading surface 19 will remain at a relatively low condensation temperature in any condition. The vapour will condense at a rate dictated by external flow heat load. In case of fire, the fact that the phase-change fluid may be non-flammable is advantageous. Inadvertent cases of vapour release in the nacelle may be harmless due to lower temperature (e.g., 100 degrees Celsius). By cooling the various heat exchangers 22 to the fluid boiling temperature, the phase-change fluid 23 boils, the vapour fills the anti-icing cavity 21 and condenses on the wall of the anti-icing surfaces 19 tending to bring the anti-icing surface 19 to the condensation temperature.

The monitoring of the anti-icing system 20 could employ temperature sensors of all sorts, for instance measuring inner cowl temperature. In terms of freeze protection for the anti-icing system, for instance during an off state, the anti-icing cavity 21 may be a bladder-type cavity. Also, the phase-change fluid may be an alcohol-water mixture. Electrical heating may also be used to initiate the first quantity of vapor, with the system 20 subsequently being self-sustained. The electrical heating may be provided directly by a coil in the anti-icing cavity 21.

In an embodiment, a method for heating an anti-icing surface 19 of a gas turbine engine 10 comprises directing bleed air of the gas turbine engine 10 to a heat exchanger 22 in a liquid pool of phase-change fluid 23 in a closed anti-icing cavity 21 to boil the phase-change fluid into a vapour state, condensing the phase-change fluid 23 in the vapour state by heating the anti-icing surface 19 conductively connected to the anti-icing cavity 21, and collecting the condensed phase-change fluid 23 in the liquid pool of the phase-change fluid of the anti-icing cavity 21. The method may comprise inflating a bladder 27 in the anti-icing cavity 21 to control a boiling temperature of the phase-change fluid 23. The method is performed without motive force, from the intake of bleed air. The method may include isolating the anti-icing surface 19 from the heat exchanger 22 by the liquid pool of the fluid 23.

The above description is meant to be exemplary only, and one skilled in the art will recognize that changes may be made to the embodiments described without departing from the scope of the invention disclosed. An advantage of using the anti-icing system 10 described herein is that the temperature is dependent on the vapour cycle and not the method of thermal input. Bleed air may be used with no valve and the aluminum structure (e.g., the wall 19A) can be retained saving weight and cost. In an embodiment, an integral splitter with anti-icing cavity 21 is provided. Still other modifications which fall within the scope of the present invention will be apparent to those skilled in the art, in light of a review of this disclosure, and such modifications are intended to fall within the appended claims.

The invention claimed is:

1. An anti-icing system for a gas turbine engine comprising:
   a phase-change fluid having a liquid portion housed in an anti-icing cavity, the phase-change fluid and cavity configured to be in heat exchange relationship with a surface of the gas turbine engine to be anti-iced, and
   a heating circuit having at least one heat exchanger in the liquid portion in the anti-icing cavity for boiling the phase-change fluid, the heating circuit in fluid communication with a compressor discharge of the gas turbine engine to direct compressor bleed air to the heat exchanger.

2. The anti-icing system according to claim 1, further comprising a pressure-regulating bladder in the anti-icing cavity, the pressure-regulating bladder being inflatable for regulating a boiling temperature of the phase-change fluid in the anti-icing cavity.

3. The anti-icing system according to claim 1, wherein the at least one heat exchanger is a coil in which the compressor bleed air circulates.

4. The anti-icing system according to claim 3, wherein at least one feed conduit extends from a compressor section of the gas turbine engine to the at least one heat exchanger.

5. The anti-icing system according to claim 3, wherein at least one discharge conduit extends from the at least one heat exchanger to a bypass duct of the gas turbine engine.

6. The anti-icing system according to claim 1, wherein the anti-icing cavity includes a wall defining the anti-icing surface of the gas turbine engine.

7. The anti-icing system according to claim 6, wherein the wall is an aluminum wall.

8. The anti-icing system according to claim 7, wherein the anti-icing surface is a splitter.

9. The anti-icing system according to claim 1, wherein the anti-icing cavity is annular.

10. The anti-icing system according to claim 1, wherein the at least one heat exchanger is immersed in the liquid portion.

11. A gas turbine engine comprising:
an anti-icing surface,
an anti-icing cavity being closed and adapted to be in heat exchange with the gas turbine engine,
a phase-change fluid in the anti-icing cavity, and
a heating circuit having at least one heat exchanger in a liquid pool of the phase-change fluid in the anti-icing cavity for boiling the phase-change fluid, a vapor of the phase-change fluid releasing heat to the anti-icing surface to condense, the heating circuit in fluid communication with a compressor discharge of the gas turbine engine to direct compressor bleed air to the at least one heat exchanger.

12. The gas turbine engine according to claim 11, further comprising a pressure-regulating bladder in the anti-icing cavity, the pressure-regulating bladder being inflatable for regulating a boiling temperature of the phase-change fluid in the anti-icing cavity.

13. The gas turbine engine according to claim 11, wherein the heating circuit includes the at least one heat exchanger, at least one feed conduit extending from the compressor discharge to the at least one heat exchanger, and at least one discharge conduit extending from the at least one heat exchanger to a bypass duct of the gas turbine engine.

14. The gas turbine engine according to claim 11, wherein the anti-icing cavity includes a wall defining the anti-icing surface of the gas turbine engine, the anti-icing surface being a splitter.

15. The gas turbine engine according to claim 14, wherein the wall is an aluminum wall.

\* \* \* \* \*